(12) United States Patent
Sciandra et al.

(10) Patent No.: US 7,246,174 B2
(45) Date of Patent: Jul. 17, 2007

(54) METHOD AND SYSTEM FOR ACCESSING AND MANAGING VIRTUAL MACHINES

(75) Inventors: John R. Sciandra, Annapolis, MD (US); Brian Cottrell, Orma, WV (US); John Sabean, Severn, MD (US)

(73) Assignee: Nacon Consulting, LLC, Annapolis, MD (US)

(*) Notice: Subject to any disclaimer, the term of this patent is extended or adjusted under 35 U.S.C. 154(b) by 559 days.

(21) Appl. No.: 10/695,467

(22) Filed: Oct. 28, 2003

(65) Prior Publication Data

US 2005/0108709 A1 May 19, 2005

(51) Int. Cl.
*G06F 15/173* (2006.01)
*G06F 15/16* (2006.01)
*G06F 9/455* (2006.01)
*G06F 9/46* (2006.01)

(52) U.S. Cl. .......................... 709/244; 709/203; 718/1; 718/104; 718/105

(58) Field of Classification Search ................ 709/203, 709/219, 244; 718/1, 104–5
See application file for complete search history.

(56) References Cited

U.S. PATENT DOCUMENTS

| | | | | |
|---|---|---|---|---|
| 5,291,597 A * | 3/1994 | Shorter et al. | .............. | 718/100 |
| 5,371,852 A * | 12/1994 | Attanasio et al. | .......... | 709/245 |
| 6,006,264 A * | 12/1999 | Colby et al. | ................ | 709/226 |
| 6,223,202 B1 * | 4/2001 | Bayeh | ........................ | 718/102 |
| 6,317,775 B1 * | 11/2001 | Coile et al. | ................. | 709/201 |
| 6,324,177 B1 * | 11/2001 | Howes et al. | ............... | 370/389 |
| 6,571,274 B1 * | 5/2003 | Jacobs et al. | ............... | 709/203 |
| 6,704,764 B1 * | 3/2004 | Ottati | ........................ | 718/100 |
| 6,854,114 B1 * | 2/2005 | Sexton et al. | .................. | 718/1 |
| 6,941,555 B2 * | 9/2005 | Jacobs et al. | ............... | 719/313 |
| 6,970,913 B1 * | 11/2005 | Albert et al. | ............... | 709/217 |
| 7,047,415 B2 * | 5/2006 | Doyle et al. | ................ | 713/178 |
| 2002/0069369 A1 * | 6/2002 | Tremain | ..................... | 713/201 |
| 2002/0103882 A1 * | 8/2002 | Johnston et al. | ........... | 709/218 |
| 2003/0088604 A1 * | 5/2003 | Kuck et al. | .................... | 709/1 |
| 2003/0182358 A1 * | 9/2003 | Rowley et al. | ............. | 709/203 |
| 2005/0102670 A1 * | 5/2005 | Bretl et al. | ................... | 718/1 |
| 2005/0249199 A1 * | 11/2005 | Albert et al. | ............... | 370/352 |

* cited by examiner

*Primary Examiner*—George C. Neurauter, Jr.
(74) *Attorney, Agent, or Firm*—Lawrence E. Laubscher, Jr.

(57) ABSTRACT

A Virtual Access Core (VAC) manages and controls access to virtual machines. A Virtual Instruction Routine (VIR) protocol is used by all components of the system to pass instructions and information about a Virtual Session. The VAC issues commands in the VIR protocol language causing virtual machines to start and stop. A VIR host that hosts virtual machines responds to VAC commands. Web clients access the system via links, which a web server uses to send access requests to the VAC. The VAC responds by searching through process memory and database tables for information about free slots on a plurality of VIR hosts grouped into a Host Array. When one or more free slots have been identified, the VAC issues VIR Protocol commands instruction one or more VIR Hosts to load and start specific virtual machines in Specific Slots.

14 Claims, 7 Drawing Sheets

METHOD AND SYSTEM FOR ACCESSING AND MANAGING VIRTUAL MACHINES

BACKGROUND OF THE INVENTION

This invention relates to the field of automated information processing, and more specifically to a computer tool for providing computer clients a method and system for accessing and managing virtual machines over a distributed network.

Virtual machines are computers that exist in software. They run in the memory of another computer called a host computer, sharing the host's hardware and network connections. The host is usually able to sponsor several virtual machines simultaneously, making ownership of multiple computers more economical. In many cases, management of networks is made easier due to a decrease in hardware requirements. The virtual machine typically consists of a file that stores all of the data for the virtual machine, including the operating system, applications and data files. An application residing on the sponsoring host will load the virtual machine file into the host's memory so that the virtual machine runs as an application on the host.

AT&T has developed and published an open-source software product called VNC that permits a first (client) computer to operate a remote (server) computer over a network. It does not matter whether the remote computer is real or virtual, or even whether the operating systems are compatible. Because of its ready availability, effectiveness and relatively simplicity, VNC remote control software is widely used for connecting client computers with remote machines. This software provides a web-based Java client that can connect to a remote host with the server software installed. Once connected, a user has full desktop access. The software, however, does not allow multiple users to access their multiple hosts through a single IP address and a single port.

Virtual machines can run in persistent or non-persistent mode. In persistent mode, any changes the client makes while using the virtual machine are saved. This allows a client to interact with a virtual machine in the same way it would with a hardware-based computer. For example, a student using a virtual machine running persistent mode might stop in the middle of a session, log off the computer, and return later to pick up the instruction at the same point. In non-persistent mode, the information and changes to the virtual machine are not stored in non-volatile memory and the virtual machine is returned to its original state at the end of a session. The advantage to non-persistent mode is that many clients can access the same virtual machine either simultaneously or sequentially and have a clean, unchanged system at each login. For example, training systems can be built with non-persistent mode, allowing students the temporary use of a virtual machine to take the training. Upon completion of training, the system is automatically restored to its original state for the next student.

The use of virtual machines is not without problems. Access and management across a distributed network is not easily accomplished. Scalability is critical to successful operation in an enterprise environment. Accessing a virtual machine directly on the host machine's console restricts the host to providing virtual machines for only a single client during each session.

In order to make such a system viable for multiple simultaneous clients, remote access to the host must be accomplished. Additionally, networking issues must be resolved in order to provide security and isolation of each client session. Such a system must be scalable, having the ability to add additional supporting hosts on the fly.

SUMMARY OF THE INVENTION

The present invention meets the above-identified needs by providing a system, method, and computer program product for providing multiple clients with efficient and effective remote access at a single IP address to one or more virtual machines over a network. In particular, the invention permits the access of virtual machines running on host computers to be controlled so that the entire array of virtual machine hosts works in unison and provides a pool of available virtual machines to multiple simultaneous clients. A load-balancing algorithm distributes the virtual machines among the hosts.

Accordingly, it is an object of the invention to provide virtual machines on more than one host server for allocation among clients.

It is also an object to allocate virtual machines among the host servers according to a load-balancing algorithm.

It is an additional object to allocate virtual machines assigned to each user among the host servers according to a load-balancing algorithm.

A method for allocating virtual machines among clients on a network in accordance with the invention includes providing one or more host servers, each of the host servers having one or more virtual machines available for allocation. Client requests for allocation of virtual machines are received and assigned, with the appropriate virtual machines being distributed among the host servers according to a load-balancing algorithm.

A computer program product in accordance with the invention includes a computer usable medium residing on a computer and having control logic that permits allocation of virtual machines among clients on a network. The control logic includes computer readable program code for providing one or more host servers, with each host server having a plurality of virtual machines available for allocation. Additional computer readable program code controls the receipt of client requests for allocation of virtual machines. Other computer readable program code assigns virtual machines to clients, with the virtual machines being distributed among the host servers according to a load-balancing algorithm.

A system for allocating virtual machines among clients on a network includes client computers connected to the network and one or more host servers. Each of the host servers has virtual machines available for allocation. A processor connects the network and the host servers. The processor includes a port for receiving client requests for allocation of virtual machines and for providing connectivity between clients and allocated virtual machines. Also within the processor is an output connected to the host servers. The processor has additional structure for distributing the allocated virtual machines among the host servers according to a load-balancing algorithm.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following drawings in which like characters represent like parts throughout the drawings and in which:

DETAILED DESCRIPTION OF THE INVENTION

The present invention relates to a system, method, and computer program product for providing multiple clients with efficient and effective remote access to one or more virtual machines residing on multiple hosts. In an embodiment of the invention, the program allows multiple client computer terminals to run one or more applications, herein referred to as modules, on virtual machines at a remote location. At the remote location are a plurality of interconnected hosts, each host being capable of providing a plurality of virtual machines. Input signals received from a client are processed by web server software that provides required system identification and resource allocation functions.

Figure 1:
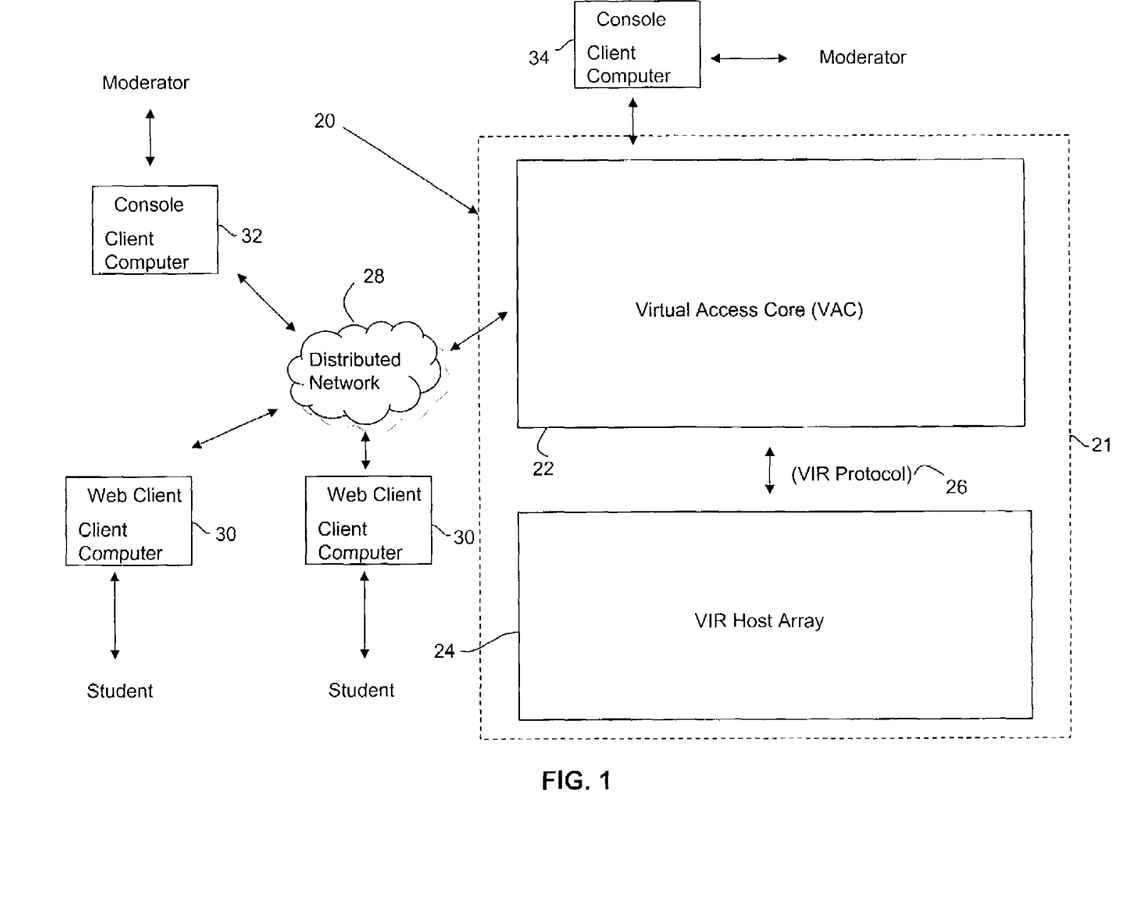
FIG. 1 is a system level view of an embodiment of the invention with principal components and their interaction.

Referring to FIG. 1, a system 20 for accessing and managing virtual machines includes a server 21 having a virtual access core (VAC) 22 and one or more virtual instruction routine (VIR) hosts 24-24. VAC 22 is preferably implemented in software residing on server 21. A VIR host can, for example, be a rack-mounted server with an entire rack comprising the array. Each VIR host 24 communicates with VAC 22 via a VIR protocol along a path 26. A plurality of client computers 30 connect to the VAC 22 by means of a network 28. Each computer 30 may be a PC, located at any site accessible to network 28 such as a home, office, or classroom. Network 28 may be a local area network or wide area network such as might be found in an office building or campus, or it might be a distributed network such as the Internet. Computers 30 have installed software suitable for communicating with the web server and utilizing the applications that it provides, such as a Java Virtual Machine for running the VNC Client. Additional client computers, such as computer 32, are connected to network 28 and may be provided with additional system privileges suitable for use by a session instructor or moderator.

Client computer 34, which may serve the function of either computer 30 or 32, is connected directly to VAC 22. However, client computer 34 is preferably used to manage the virtual sessions and provide a session moderator with a view into the status of the overall system. Data elements are retrieved and presented to the moderator on user ID, session number, virtual machines running and host array slots assigned to each session. The console provides a way to terminate client connections or virtual machine sessions. It additionally provides a view of the overall host array ordered by VIR hosts and slots in use.

Figure 2:
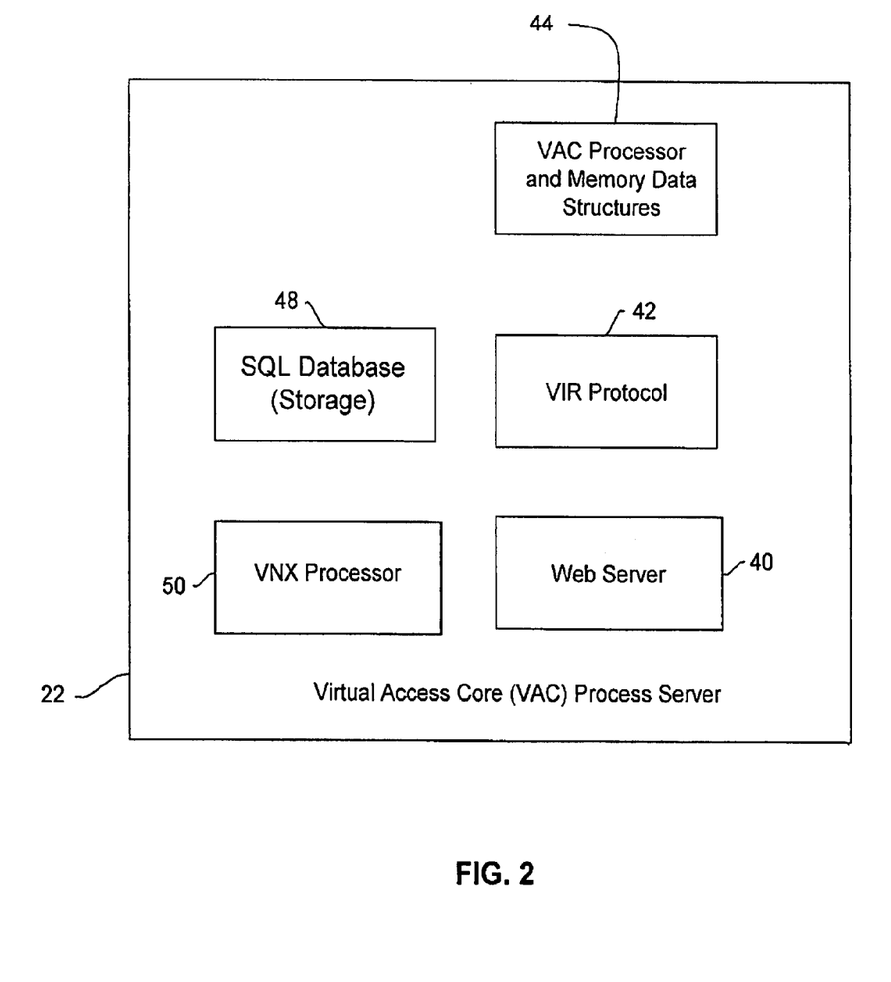
FIG. 2 is a block diagram of a VAC in accordance with an embodiment of the invention, showing its primary components.

Referring to FIG. 2, VAC 22 includes a web server 40, a VIR protocol processor 42, a VAC processor 44, a database storage device 48, and a VNC proxy processor 50.

Web Server 40 provides an interface to network 28 for communication with client computers 30 and 32. Software on the web server controls access to the system via a user table 104 (FIG. 5) and a session table 100. Once a session for a client has been established, the session identifier in session table 100 is used to uniquely identify the client within the system.

VIR protocol 42 is used for communication between system components. An embodiment suitable for use in the invention includes the following commands:

Ping—a keep alive function, preferably every ten seconds
Ping reply—answer to ping request
Set type—refers to the element wishing to communicate using the VIR protocol as follows:
Web Server
Virtual Machine Server
Firewall
Set config—for type GSX, informs the VAC of information about specific VIR hosts by reading information set in "vir.conf" on each VIR host. Vir.conf contains fields on performance and tuning of the VIR host such as how many VIR slots the VIR host will support. Vir.conf fields are as follows:
 UNIQUE—ID—a unique identifier assigned to the host
 VSLOTS—a configurable number of VIR slots the host will support
 DB—IP—IP address of the VIR host
 VIRTTMPDIR—where the slots are located
 VIRTDIR—where the virtual machines are stored
 DBNAME—name of the database used to connect to the VAC
 DBUSER—name of user to connect to the database on VAC
 DBPASS—connection password
Spin virtual—instructs a VIR host to locate the virtual machine, copy it to a specific slot and instruct the virtual machine server to activate the virtual machine. Finally instruct the Network Bridge builder to use rules in table 92 to isolate network.
Set unique—give each node in system a unique identifier:
Web server
GSX 1
GSX 2
Etc.
Req module—web server request to retrieve and activate a specific virtual machine.
Diff module—check if a given session is already using a virtual machine before honoring a new request from the web server.
Module status—return the status of a virtual machine request to the web server:
Module copying
Booting
Running
Module ready—return status to web server
Module spin—return status to web server
Module error—return "no slots left" status to web server
Module update—return percentage of virtual machine copied into slot to web server
Get IP—from VNC proxy to VAC
Logout—web server to VAC
Kill virtual—VAC to VIR host
Database 48 is used for saving and accessing information about current system status as resources are allocated among users logged into the system.

VNC processor 50 provides a conduit by which all client computers 30, 32, 34 can connect to virtual machines, described below, associated with their session through a single IP address. The proxy creates and monitors the routing information to ensure that the correct virtual machine in the correct VIR host is made available to the correct user throughout a session.

Figure 3:
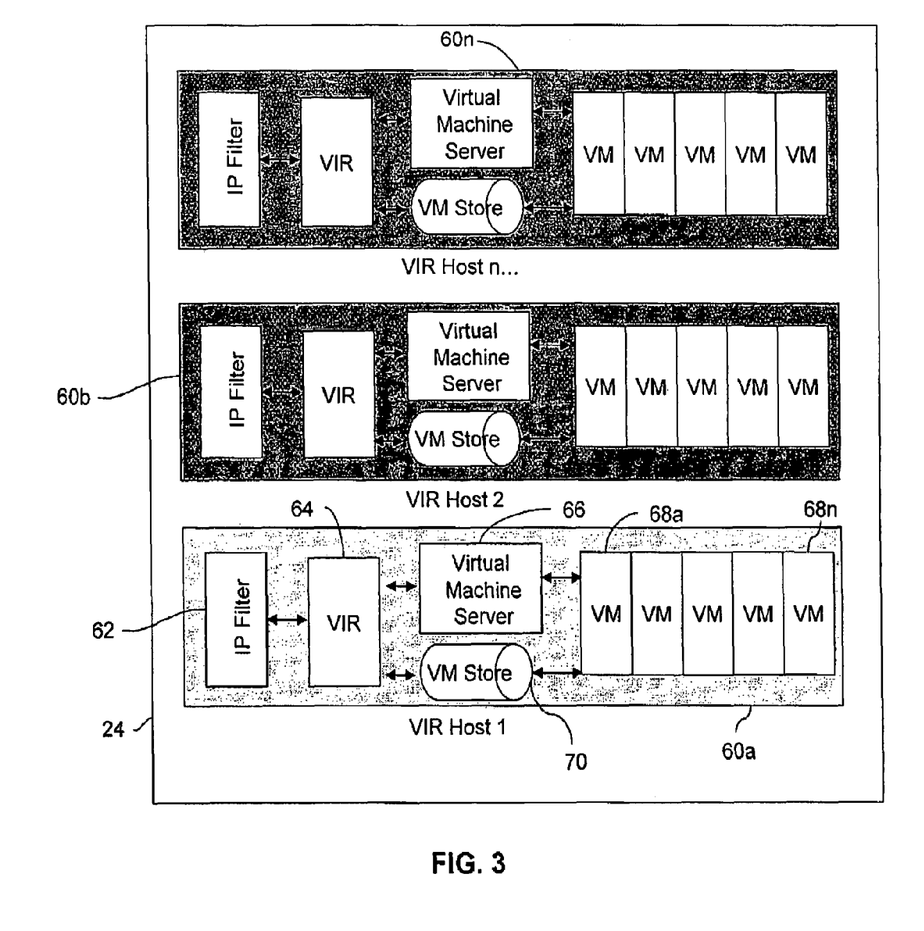
FIG. 3 is a block diagram of a VIR host array in accordance with an embodiment of the invention.

Referring to FIG. 3, each VIR host array 24 includes one or more VIR hosts 60a-60n. Host 60a includes an Internet Protocol (IP) filter 62 that communicates with VAC 22. Virtual instruction routine 64 permits communication with IP filter 62, virtual machine server 66 and virtual machine store 70. A plurality of virtual machine slots 68a-68n are provided for receipt of virtual machines from virtual machine store 70 under the direction of the VIR client 64. Each of the hosts 60b-60n is configured similarly to host 60a.

Virtual machine store 70 is a repository of files, with each file containing a virtual machine accessible within system 20. Each virtual machine file contains all of the software necessary to permit a user of client computer 30, 32 or 34 to perform a task offered by the system. For example, a virtual machine suitable for use in the present invention might be created by a company to permit clerk/typists to telecommute between their individual homes and a central office. The file containing such a virtual machine includes an operating system such as Windows 2000, an office applications package such as Microsoft Office, and all the standard templates, macros and other custom tools developed by the office for permitting clerk/typists to efficiently generate products in accordance with office protocol and standards. By logging onto the system, each clerk/typist is presented with an identical desktop providing access to every office application in an identical format. The desktop seen by the user is a web browser window that provides access to the virtual machine or machines located at the host server. All generated work is saved on the central office server.

A "module," as used herein, is a link to a virtual machine, or group of virtual machines, that is presented to a user who logs onto the system. Each module consists of a combination of data, virtual machines and access rules assigned to slots 68 on one or more of the VIR hosts 60, and their assigned IP address. One example of a module is the single virtual machine described above that presents a desktop to a telecommuter. Another example, including a collection of virtual machines in a single module, is a training course for teaching a system administrator how to set up a mail server. Upon logging onto the system, the system administrator requests the mail server training module, which might include three virtual machines: (1) a virtual machine including course materials with text, illustrations, examples, exercises and testing materials; (2) a virtual machine emulating a mail server host on which the system administrator practices setting up a mail server; and (3) a virtual machine emulating a client connected to the host to which the system administrator practices sending email to confirm that the host has been set up correctly.

Efficiency of the system is enhanced if all modules accessible in the system are stored in the Virtual machine store 70 of each VIR host 60a-60n. In an alternative embodiment, a single copy of each module could be stored in the system and copied as needed to the then-active VIR hosts. Considerations of efficiency also suggest that a user will preferably be restricted to use of only a single module at a time, but this is not a constraint imposed by the invention. As is obvious from the second example above, it is likely that a user will have simultaneous access to more than one virtual machine during a session.

Figure 4:
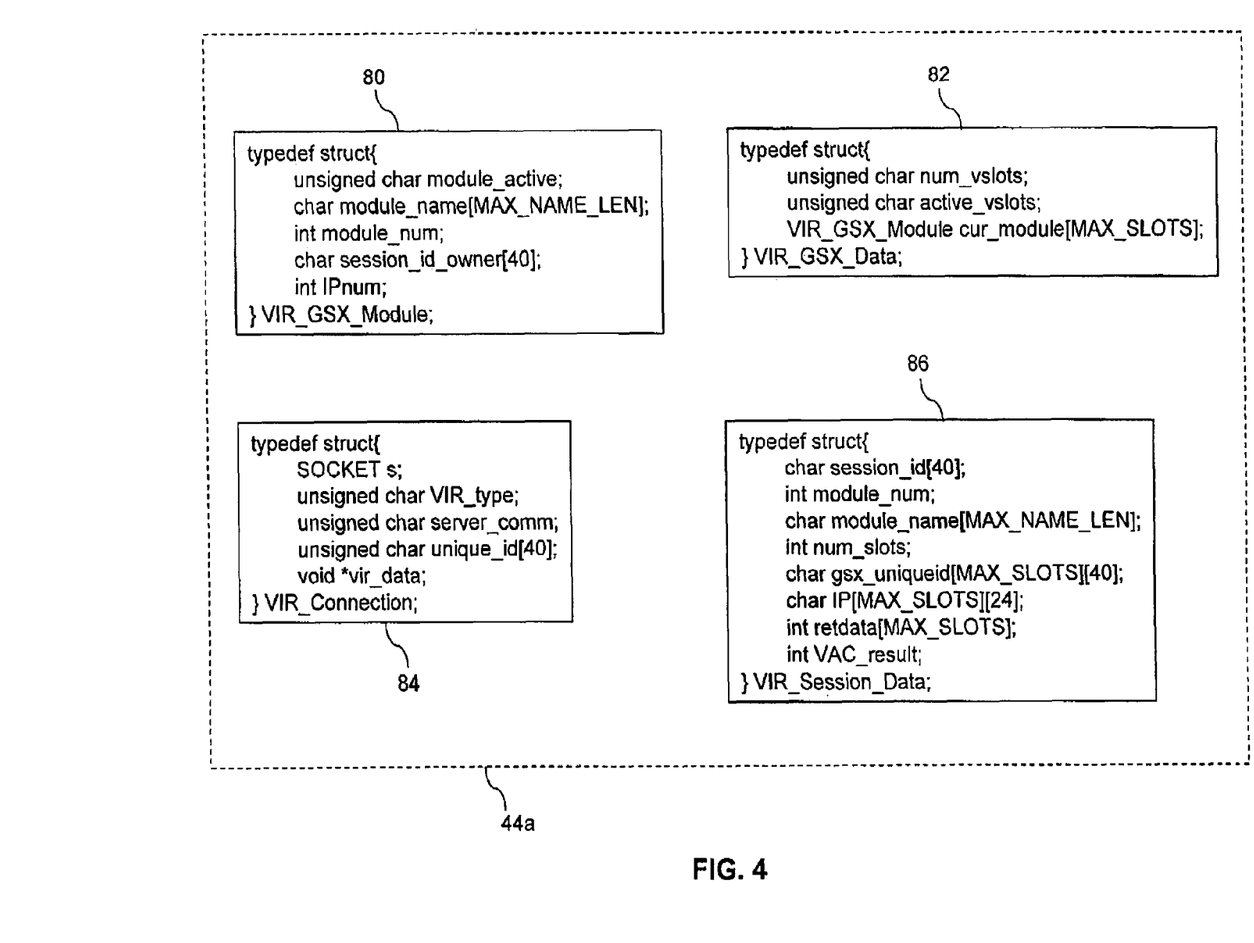
FIG. 4 illustrates selected database structures within the VAC.
Figure 5:
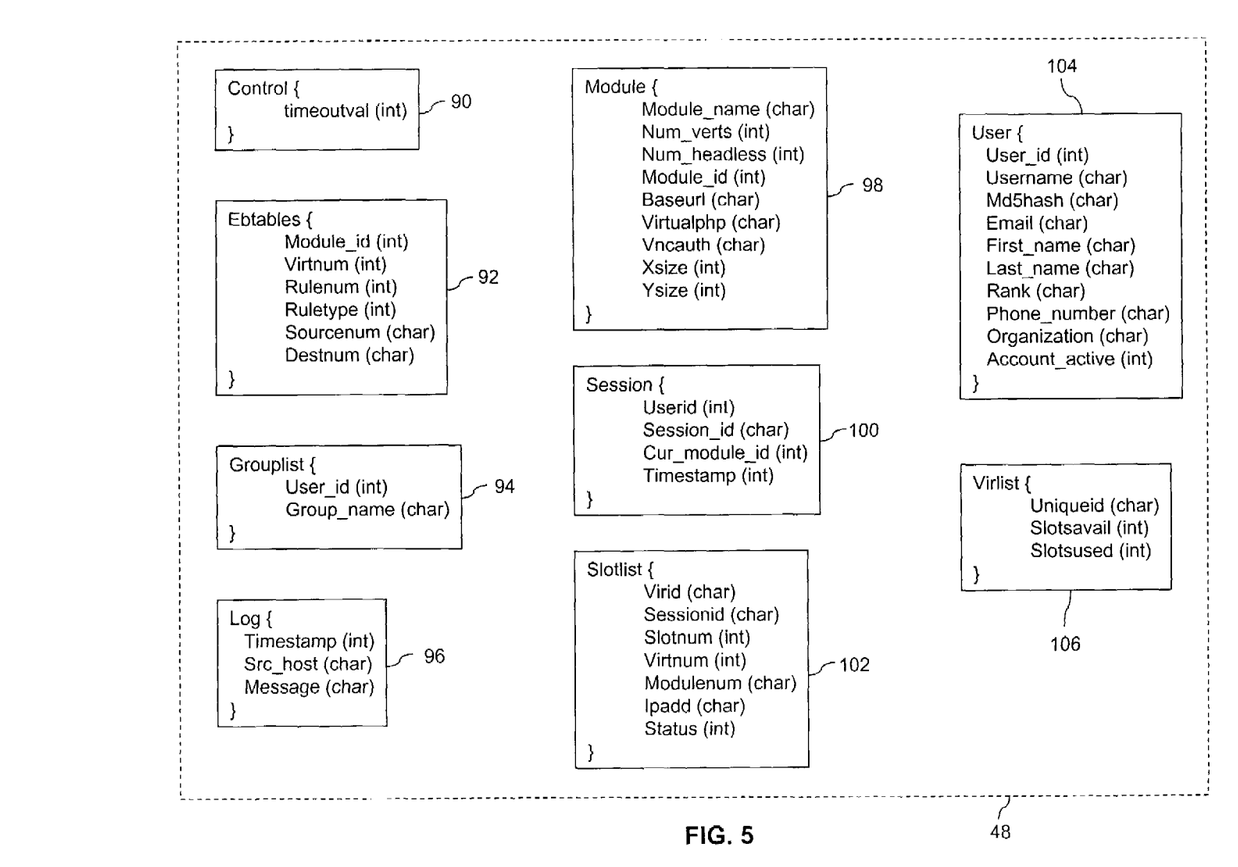
FIG. 5 illustrates additional selected memory structures within the VAC.

FIGS. 4 and 5 illustrate representative data structures in accordance with an embodiment of the invention. In the specific embodiment described herein, data structures 80, 82, 84 and 86 are stored in a memory 44a associated with VAC processor 44 and are populated by instructions from VAC processor 44 in accordance with requirements determined by the number and needs of users logged onto system 20 at any given time. Structure 80 holds information on active modules. Structure 82 holds the status of each VIR host and information on slots associated with that host. Structure 84 contains information on the connection between a client and the VAC. Structure 86 holds data regarding each individual session. These structures are populated as the VAC receives instructions from clients and VIR hosts. Database tables 90 through 106, as illustrated in FIG. 5, are stored in database storage device 48 and are also populated by instructions from VAC processor 44 in accordance with requirements determined by the number and needs of users logged onto system 20 at any given time.

Structure 90 stores system default timeout value, used to determine when a virtual session should be terminated for inactivity. Structure 92 stores network bridge builder rules in 'ebtables 'used to isolate virtual machines into a virtual network. Structure 94 is used as authentication and identification by the system login scripts. Structure 96 is the system log, used for auditing system events. Structure 98 stores geometry for loading and display of the virtual machine. Structure 100 stores session information used for tracking and managing of current sessions. Structure 102 stores information about the slot a session is currently using. Structure 104 stores user information to permit login and auditing systems to authenticate and identify users. Structure 106 holds information about registered VIR hosts.

During the process loop, messages arrive from the web server requesting one or more virtual machines. The VAC searches both the memory structures and the database to identify resources that are assigned to the session for which the web server has requested them. The VAC sends the requests to the selected VIR hosts with instructions on which virtual machine image to load into a particular free slot on the VIR host.

The VIR host processes the VAC message by copying the virtual machine image into the assigned slot. During this copying process, the IP address of the virtual machine is changed to the IP address determined by the VAC. The VIR host then starts the virtual machine. As the virtual machine image is copied into its assigned slot and booted, the VIR host sends periodic status messages back to the VAC and to the VNC proxy.

Once the system is booted and running the client accesses the virtual machines through the VNC proxy and a web browser. When finished, the client sends a message to the VAC notifying it to terminate the virtual machine and possibly the client session as well. The VAC sends this information to the VIR Host which then properly shuts down the session and performs housekeeping functions before making the slot available to the next student.

Prior art virtual machine hosting software such as VMWare (a commercially available product of VMWare, Inc.) will typically create a virtual network adapter for the virtual machine. Various options for implementing the network adapter have been developed, but none allow any control over traffic between virtual machines operating on the same host. For example, a "host only" mode permits a virtual network interface to be created on a host with all virtual machines having unrestricted access with each other. The host operating system must be configured to route the traffic or the virtual machines will be unable to connect to any other network. A virtual machine network adapter utilizing a network access translator (NAT) is similar to the host only mode except that outbound traffic communicates to other networks through a physical interface on the host. Alternatively, a virtual adapter operating in "bridged" mode has direct access to the same physical adapter as the host operating system. This gives each virtual machine unrestricted access to the network and other virtual machines operating in the same mode on the same adapter.

The present invention permits traffic between virtual machines operating on the same host to be controlled by creating multiple-host only networks, giving each virtual machine its own host-only network. A network bridge between interfaces on the host computer puts each of the host-only networks on the same network as a selected physical network interface, with the host operating system controlling traffic to and from the bridge. By having the operating system perform this network bridging, as opposed to the virtual machine software, it is possible to apply access rules to control virtual machine access to the bridge. Rules for controlling what traffic is permitted to and from the network bridge are defined in the "ebtables" utility in structure 92, to ensure that virtual machines on the same host are effectively firewalled from each other as well as from virtual machines running on other hosts.

To enable this setup, the default setting prevents any virtual machine from communicating with the bridge. As each virtual machine is initialized, a set of default access rules are put in place to allow the virtual machine to communicate with critical system components, namely: database, VAC, web server, and VNC proxy. The virtual machine is then given permission to communicate with all other virtual machines associated with the running module.

Upon module termination, each of the rules added to the network bridge must be removed, to ensure that the slot is ready for the next session.

Figure 6:
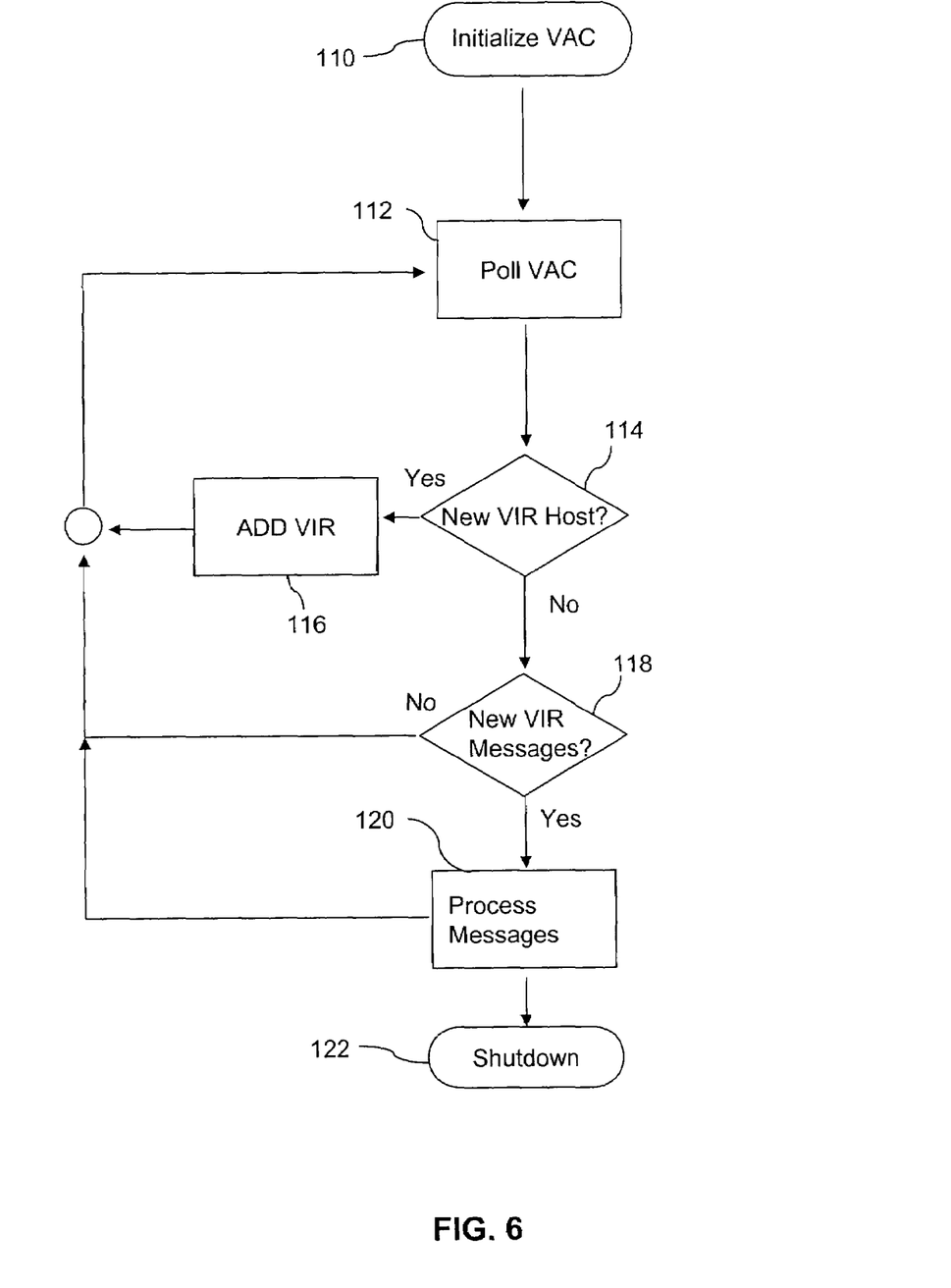
FIG. 6 is a flow chart of a process in accordance with an embodiment of the invention.

FIG. 6 illustrates an embodiment of how the present invention is used to permit users to access virtual machines over a distributed network. In step 110, VAC 20 is initialized. Each VIR host array 24 is assigned a unique identifier, a maximum capacity of virtual hosts 60a-60n, and the number of available slots 68a-68n, all quantities being stored for access and use by VAC processor 44. VAC 22 then registers the VIR hosts, and makes their resources available to system 20.

In step 112, VAC 22 initiates continuous monitoring of a TCP/IP port for incoming information from computers 30, 32 or 34. Incoming information may include a request from a new VIR host for connection of an unregistered client 30, 32, 34 as illustrated by the cycle defined by steps 112, 114, 116 and 112. Alternatively, incoming information may include a request from a previously identified VIR host for processing of an instruction received from a currently registered client as illustrated by the cycle defined by steps 112, 114, 118 and 112.

If a new VIR host request is detected at step 114, the command "add vir" is executed, specific memory structures are allotted at step 116, and the VIR host is registered in VIR host array 24. Once the new VIR host has been registered on the VAC it becomes a part to the VIR host array, which serves as a pool of slots for virtual machines. As clients 30, 32 and 34 access modules (e.g., log on and request access to virtual machines), VAC 22 selects a VIR host based on a load-balancing algorithm to optimize processing times. For example, a client may log on and be assigned VIR host 60a. VAC 22 transmits information and instructions needed by VIR host 60a to copy appropriate virtual machines from the virtual machine store 66 into virtual machine slot 68a. Virtual machine server 66 starts the associated virtual machines and VAC 22 transmits information for associating the virtual machines with a specific client session (session ID). VAC 22 issues one of these commands for each virtual machine associated with the module being initialized. The process continues to return to step 112 to detect registration requests from new VIR hosts throughout the time VAC 22 is active.

If no new VIR host request is detected at step 114, the system looks for incoming instructions from previously registered VIR hosts at step 118. A lack of incoming instructions causes the process to loop back to step 112. Instructions detected at step 118 include VIR host messages that have been received from a connected client and are waiting on a socket connection to be serviced sequentially for each VIR host.

The client shutdown step 122 is initiated when a client computer logs off or otherwise indicates it has completed use of a module. VAC 22 sends a signal to each VIR host that has a module running associated with that client's session. Each VIR host deactivates those virtual machines associated with that session, clears the access control list, and deletes the virtual machine from its assigned slot. This frees the slot on the VIR host and makes it available for a new client session.

Figure 7:
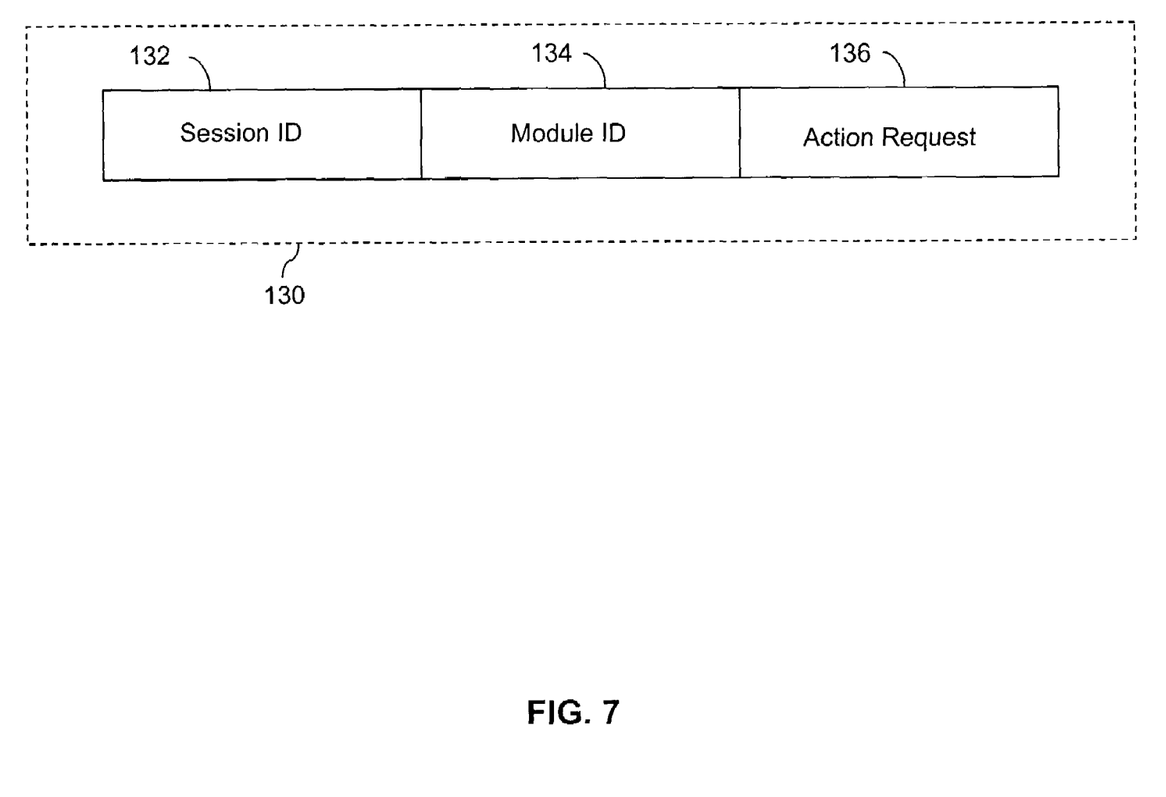
FIG. 7 illustrates the components of a message received at the VAC from a client.

Because the present invention allows for potentially hundreds of virtual machines, a practical method of allowing client access to virtual machines through a single IP address is required. To accomplish this, the client transmits a three-part message 130, consisting of a session identifier 132, a module identifier 134 for the requested module, and an action request 136 to web server 140 as shown in FIG. 7. Web server 40 identifies each registered client computer with a unique IP address for communication with VNC proxy 50. VNC proxy 50 determines the correct virtual machine IP address on the inside of the network and connects to the VNC server on that host. The VNC proxy then relays all VNC protocol data from the user's connection to the target virtual machine. The VNC software receives the protocol data and operates in its normal way, with all proxying being transparent to the user.

Web server 40 uses an applet to send a request for the desired module to virtual machine server 66, which copies those files comprising the associated virtual machines from virtual machine store 70 to a directory associated with the specified slot 68. During this copying process, the VIR host scans for a marker, allowing the VIR host software to change the virtual machine's IP address to one specified by VAC 22. The VIR host sends status messages to VAC 22 during the copying process. Once copying is complete, the VIR host establishes access controls for the virtual machines and initializes their boot processes. Web server 40 monitors the status of the virtual machine copying process and the status of the virtual machine in the boot process. Once the VIR host has reported to VAC 22 that the virtual machine has successfully booted, web server 40 connects the virtual machine and the client via VNC proxy 50. VNC proxy 50 relays action request 136 to the proper VIR host on a continuing basis throughout the session.

While the preferred forms and embodiments of the invention have been illustrated and described, it will be apparent to those of ordinary skill in the art that various changes and modifications may be made without deviating from the inventive concepts set forth above.

What is claimed is:

1. A method for allocating virtual machines among clients on a first network, comprising the steps of:
    (a) providing an array of two or more host servers, each host server having a plurality of virtual machine slots available for allocation;
    (b) receiving client requests for allocation of virtual machine slots;
    (c) assigning virtual machine slots to clients, the virtual machine slots being distributed among the host servers in a second client network according to a load-balancing algorithm; and
    (d) copying selected files from a file repository of requested virtual machine slots to a memory location assigned to a specific client.

2. The method of claim 1 wherein the step of receiving client requests further includes receiving the requests at a single IP address.

3. The method of claim 2 wherein the step of assigning virtual machine slots further includes assigning each virtual machine slot to only one client.

4. The method of claim 3, and further comprising the step of associating each client with a unique session identifier.

5. The method of claim 4, and further comprising the step of maintaining client access to its assigned virtual machine slots for the duration of the session.

6. The method of claim 5, and further comprising the step of monitoring the network for receipt of data from additional clients.

7. A computer program product comprising a computer usable medium having control login stored therein and residing on a server to permit allocating virtual machine slots among clients on a first network using an array of at least two host servers, each host server having a plurality of virtual machine slots available for allocation, said control logic comprising:
    (a) computer readable program code means for receiving client requests for allocation of virtual machine slots;
    (b) computer readable program code means for assigning virtual machine slots to clients, the virtual machine slots being distributed among the host servers in a second client network according to a load-balancing algorithm; and
    (c) computer readable program means for instructing the at least two host servers to copy selected files from a file repository of requested virtual machine slots to a memory location assigned to a specific client.

8. The computer program product of claim 7, wherein the means for receiving client requests further includes means for receiving the requests at a single IP address.

9. The computer program product of claim 8, and further comprising means for associating each client with a unique session identifier.

10. The computer program product of claim 9, and further comprising means for maintaining client access to its assigned virtual machine slots for the duration of the session.

11. The computer program product of claim 10, and further comprising means for monitoring the first network for receipt of data from additional clients.

12. A system for allocating virtual machines among clients on a first network, comprising:
    (a) a plurality of client computers connected to the first network;
    (b) an array of two or more host servers, each server having a plurality of virtual machine slots available for allocation;
    (c) a processor connecting the first network and the host servers, said processor including
        (i) a port for receiving client requests for allocation of virtual machine slots and for providing connectivity between clients and allocated virtual machine slots,
        (ii) an output connected to the host servers, and
        (iii) means for distributing the allocated virtual machine slots among the host servers in a second client network according to a load-balancing algorithm.

13. The system of claim 12, wherein the host servers include a directory containing a copy of the virtual machine slots that have been assigned to the client computer.

14. The system of claim 12, wherein the host servers include a plurality of directories, each directory containing a copy of the virtual machine slots that have been assigned to a client computer, with each client computer having access to only that one directory.

* * * * *